Aug. 25, 1942.  H. M. JOHNSTON ET AL  2,294,234
BEARING FOR DISK HARROWS AND THE LIKE
Filed July 5, 1940   2 Sheets-Sheet 1

INVENTORS
HOWARD M. JOHNSTON
PEDER BJERRE
BY A.S.Krotz
ATTORNEY

Aug. 25, 1942.   H. M. JOHNSTON ET AL   2,294,234
BEARING FOR DISK HARROWS AND THE LIKE
Filed July 5, 1940   2 Sheets-Sheet 2

INVENTORS
HOWARD M. JOHNSTON
PEDER BJERRE
BY A.S.Krob
ATTORNEY

Patented Aug. 25, 1942

2,294,234

UNITED STATES PATENT OFFICE 2,294,234

BEARING FOR DISK HARROWS AND THE LIKE

Howard M. Johnston and Peder Bjerre, Toronto, Ontario, Canada, assignors to Massey-Harris Company Ltd., Toronto, Ontario, Canada, a company of Canada Application July 5, 1940, Serial No. 344,040

3 Claims. (Cl. 308—19)

The present invention relates to bearings particularly adapted for use on disk harrow gangs wherein the gangs are formed by means of a shaft, spaced disks and sleeves therebetween and wherein the bearings are positioned between certain disks and acting as the sleeve between these disks.

Bearings of the class are difficult to design because their frictional surfaces cannot be protected against more or less abuse and dirt and because they cannot be supported in a perfectly rigid structure and in alignment with each other. However, bearings of the class must be strong, capable of operating under the most difficult conditions, having long life, and capable of being manufactured at low cost.

Another difficulty in designing bearings of the class is that the wearing surface must be made from gray iron and chilled; therefore, machining of the hardened parts must be dispensed with.

We provide a bearing wherein the sleeves of the bearing act as spacing means between the disks and wherein the parts are easily manufactured and assembled and wherein the friction surfaces may be conveniently and efficiently chilled, thus to add greatly to the wearing qualities of the bearing under all conditions of service and provide a bearing which can be manufactured at low cost, easily assembled and replaced.

To these and other useful ends, our invention consists of parts, combinations of parts, or their equivalents, and mode of operation, as hereinafter set forth and claimed and shown in the accompanying drawings in which:

Figure 1:
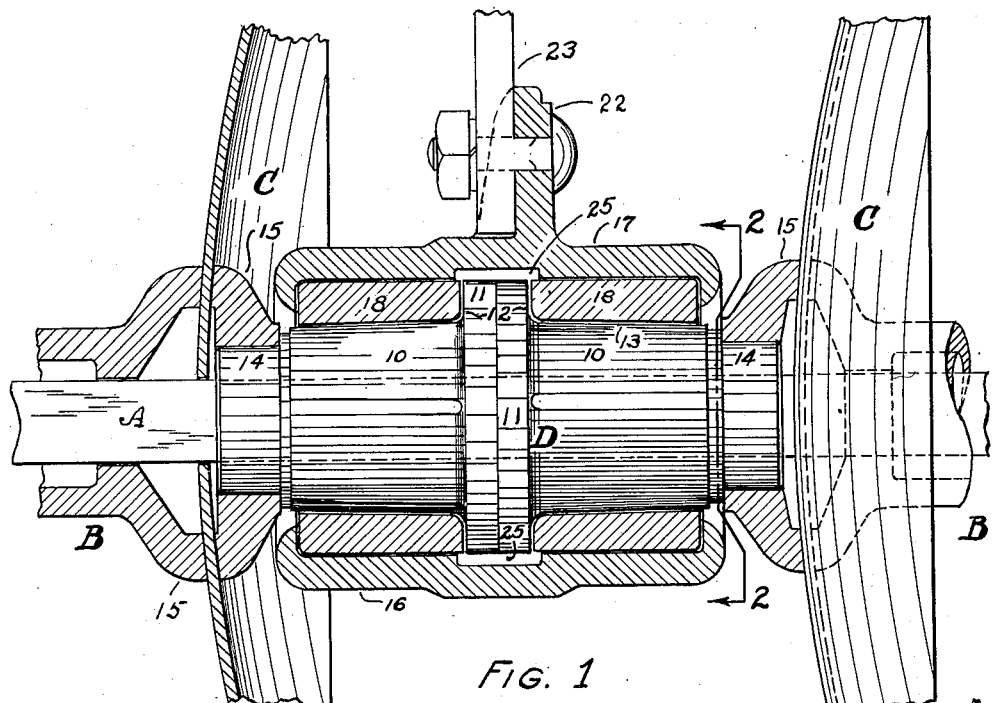
Fig. 1 is a longitudinally sectioned view of our improved bearing illustrating fractionally parts of the axle, disks and axle sleeves.

As thus illustrated, we designate the axle of the gang by reference character A. The separating sleeves are designated by reference character B. The disks are designated by reference character C and the bearing sleeves are designated, in their entirety, by reference character D.

Figure 3:
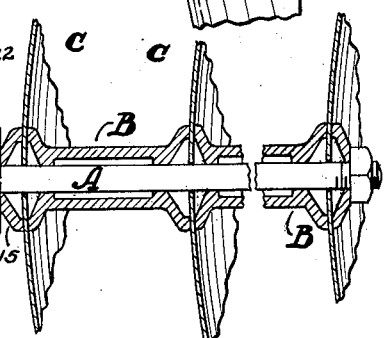
Fig. 3 is a fractional assembly view of a disk gang, illustrating one of the frame bearings and a spacer sleeve in position between the disks.

As illustrated in Figure 3, a number of disks and sleeves are positioned on axle A. At certain intervals, sleeve B is dispensed with and the bearing sleeve, as shown in Figure 1, is substituted.

It is the custom to provide axle A with a head, at one end, and a washer and screw threaded nut at the other end (see Figure 3) so the entire assembly may be held tightly together. Axle A is preferably square in cross section (see Figure 2).

Sleeves $b$ are provided with enlarged annular surfaces suitable for contact with the disks. The bearing sleeves, at their ends, are designed exactly like the ends of sleeves B. These bearing sleeves consist of two axle sleeves 10—10 each being provided with flanges 11—11 which abut.

The bearing surface of the sleeves consists of the flange surfaces as at 12 and the circular extensions as at 13, the extensions being slightly tapered outwardly toward their ends and having projections 14 on which are mounted collars 15.

Thus, when the two sleeves and two collars are assembled, as illustrated in Figure 1, they will act similar to sleeves B as spacing means for the adjacent disks. It is contemplated that projections 14 may be machined true with surfaces 13 and in concentric alignment with the square openings in the sleeves. It will be understood that these square openings are adapted to slidably embrace the axle. Collars 15 may be machined true where they fit over members 14 and against the rear shoulder thereof. Thus, when the nut on the end of the axle is made taut, the bearing sleeves and disks will be held true with the axle.

In medium length gangs, it is the custom to provide two frame bearings for each gang. In longer gangs, more bearings may be supplied.

Figure 2:
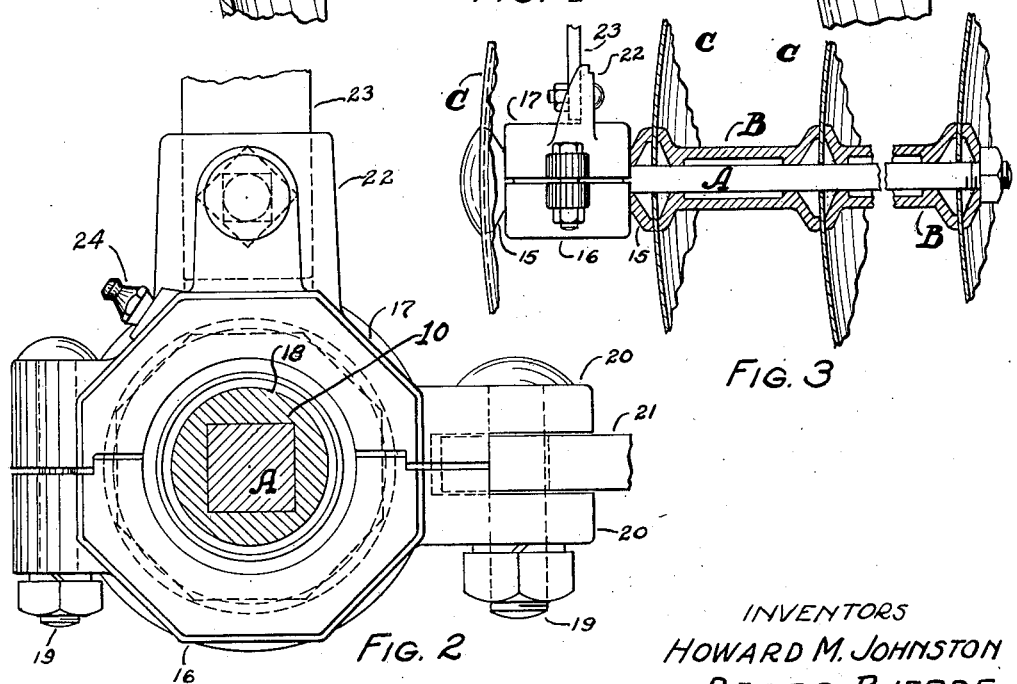
Fig. 2 is an end view of the bearing illustrated in Figure 1 taken on line 2—2 of Figure 1.

We provide a bearing housing consisting of a lower cap 16 and an upper member 17. Members 16 and 17 are adapted to receive two sleeves 18—18 as illustrated in Figures 1 and 2. The sleeves are held tightly between the housing members by means of bolts 19—19. Housing sleeves 18 are slightly tapered to correspond with the exterior of bearing sleeves 10 so that when the bearing caps are made taut, the sleeves will turn freely on the axle collars and flanges 11 will act to take the end thrust. The forward ends of the bearing caps are provided with forwardly projecting ears 20—20 between which a draw bar 21 is loosely mounted.

Figure 4:
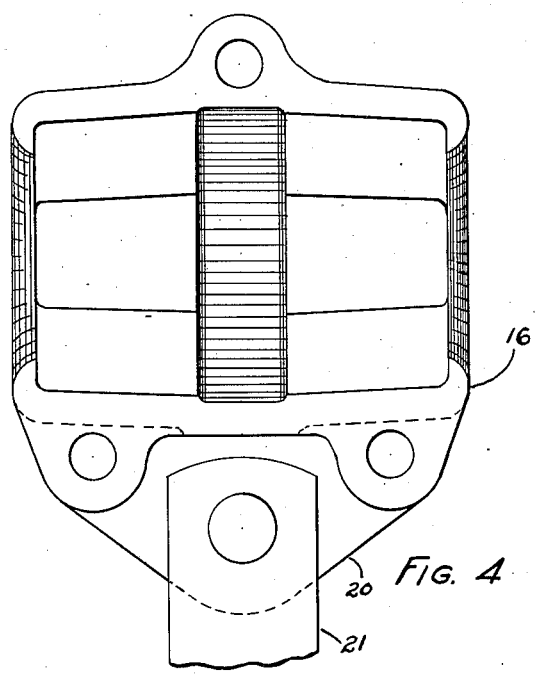
Fig. 4 is a top view of the lower half of the bearing housing as illustrated in Figure 3.
Figure 5:
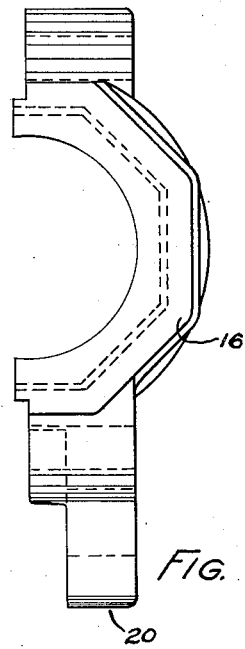
Fig. 5 is an end view of the bearing housing illustrated in Figure 4.

Draw bar 21 is provided with an opening through which bolt 19 extends (see Figures 2 and 4), so the draw bar is free to swing to the right or left. The upper cap of the bearing housing is provided with a bracket 22 to which a post 23 is secured, the post forming a connection between the bearing and the gang frame as is the custom in harrows of the type.

Some disk gangs are not supplied with frames but all must have the draft links. Some are provided with frames to which the draft links are attached. In either event, my bearing is suitable for the rotating connection between the frame and draft links and the axle.

Surfaces 12 and 13 are chilled, and at least at the inner ends, members 18 and their openings are chilled. Thus, all of the wearing surfaces of the bearing are chilled.

Figure 6:
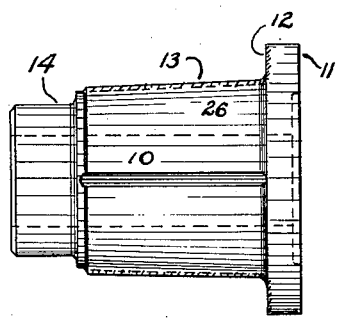
Fig. 6 is a side elevational view of one of the bearing sleeves.
Figure 7:
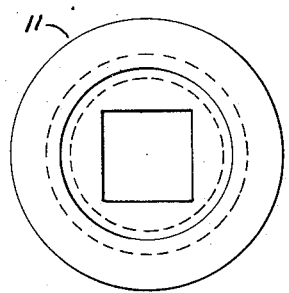
Fig. 7 is an end view of the sleeve illustrated in Figure 6, when viewed from the flanged end.
Figure 8:
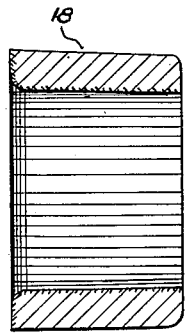
Fig. 8 is a longitudinally sectioned view of the housing sleeves.
Figure 9:
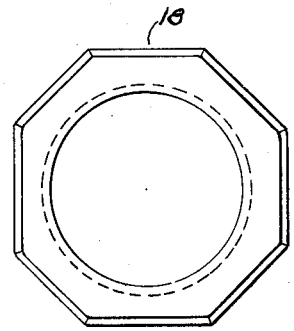
Fig. 9 is an end view of the sleeve illustrated in Figure 8.

In Figures 6 and 8, we illustrate the chilled surfaces of members 10, and 18 by means of short closely spaced lines.

In Figure 2, numeral 24 designates a lubricating fitting. Generally this fitting is adapted to receive bearing grease from a grease gun or otherwise.

A screw threaded opening is provided for fitting 24 which extends into a chamber 25. Thus, it will be seen, that grease is supplied to the center of the bearing and that it must gradually work out toward the ends of the bearings between the chilled surfaces. Thus, the grease will act to move outwardly any foreign matter that may accumulate in the bearing.

Clearly we have provided a simple and efficient axle bearing sleeve consisting of four parts and a housing which is rotatably mounted on this sleeve consisting of four parts. It will be noted when either members 10 or 18 are worn out, they may be easily replaced at low cost, and that our invention is simple, light, strong, efficient, easily and cheaply manufactured, and that the wearing parts may be easily and cheaply replaced.

Having thus shown and described our invention, we claim:

1. A disk harrow bearing of the class described comprising a shaft with spaced disks mounted thereon, two sleeves each having a peripheral flange on one end mounted on said shaft midway said disks with the flanges contacting, integral collars mounted on the outer ends of said sleeves having peripherally extended flanges adapted to contact the adjacent surfaces of the disks, means on said shaft to tightly bind said disks, collars, and sleeves together, annular bearing sleeves mounted on said flanged sleeves on opposite sides of said flanges, a split bearing housing adapted to embrace said annular bearing sleeves and having inwardly turned flanges adapted to contact the outer ends of said annular bearing sleeves.

2. A disk harrow bearing of the class described comprising a shaft with spaced disks mounted thereon, two sleeves each having a peripheral flange on one end mounted on said shaft midway said disks with the flanges contacting, flanged collars mounted between the outer ends of said sleeves and the disks to thereby form spacing means, means on said shaft to tightly bind said disks, collars, and sleeves together, annular bearing sleeves mounted on said flanged sleeves on opposite sides of said flanges, a split bearing housing adapted to embrace said annular bearing sleeves and having inwardly turned flanges adapted to contact the outer ends thereof.

3. A device as recited in claim 2 including: the bearing surfaces of said first bearing sleeves being slightly tapered or smaller in diameter toward their outer ends.

HOWARD M. JOHNSTON.
PEDER BJERRE.